United States Patent [19]
Lee et al.

[11] Patent Number: 5,729,716
[45] Date of Patent: Mar. 17, 1998

[54] MEMORY MONITORING CIRCUIT FOR DETECTING UNAUTHORIZED MEMORY ACCESS

[75] Inventors: Young W. Lee, Orange; Sungwon Moh, Wilton; Arno Muller, Westport, all of Conn.

[73] Assignee: Pitney Bowes Inc., Stamford, Conn.

[21] Appl. No.: 648,454

[22] Filed: May 15, 1996

Related U.S. Application Data

[63] Continuation of Ser. No. 163,811, Dec. 9, 1993, abandoned.

[51] Int. Cl.⁶ ............................................. G06F 12/16
[52] U.S. Cl. ............................................. 395/490; 395/186
[58] Field of Search ........................... 395/490, 491, 395/186, 188.01, 430, 482, 493; 380/4

[56] References Cited

U.S. PATENT DOCUMENTS

| | | | |
|---|---|---|---|
| 4,424,573 | 1/1984 | Eckert, Jr. et al. | 364/464.02 |
| 4,701,656 | 10/1987 | DiGiulio et al. | 364/466 |
| 4,710,882 | 12/1987 | DiGiulio et al. | 364/464.02 |
| 4,747,057 | 5/1988 | DiGiulio et al. | 364/464 |
| 4,785,469 | 11/1988 | Joshi et al. | 375/110 |
| 4,817,004 | 3/1989 | Kroll et al. | 364/464.02 |
| 4,998,203 | 3/1991 | DiGiulio et al. | 364/464.02 |
| 5,136,590 | 8/1992 | Polstra et al. | 371/16.2 |
| 5,179,540 | 1/1993 | Stockton | 365/225.7 |
| 5,303,181 | 4/1994 | Stockton | 365/96 |
| 5,559,992 | 9/1996 | Stutz et al. | 395/490 |

FOREIGN PATENT DOCUMENTS

| | | | |
|---|---|---|---|
| 0 194 660 A2 | 9/1986 | European Pat. Off. | G07B 17/02 |
| 0 223 130 A2 | 5/1987 | European Pat. Off. | G07B 17/02 |
| 0 223 130 A3 | 5/1987 | European Pat. Off. | G07B 17/02 |
| 0 527 010 A2 | 2/1993 | European Pat. Off. | G07B 17/02 |
| 0 608 060 A1 | 7/1994 | European Pat. Off. | G06F 12/14 |

*Primary Examiner*—Eddie P. Chan
*Assistant Examiner*—Hiep T. Nguyen
*Attorney, Agent, or Firm*—Angelo N. Chaclas; Charles G. Parks, Jr.; Melvin J. Scolnick

[57] ABSTRACT

The memory security circuit detects when a memory unit has been accessed independently of an address instruction of a programmable microprocessor. The microprocessor is programmed to provide a unique address signal for write enabling a discrete memory unit. The memory unit has a write enable pin and chip select pin which when enabled in combination permits writing into the memory unit. The address decoder receives the unique address instruction and causes a write enable signal and a chip select signal to be generated for that memory unit. The write enable signal and chip select signal are to be received, respectively, by the write enable pin and the chip select pin of the memory unit. The memory security circuit monitors the write enable pin and the chip select pin of the memory unit and generates a first output signal when the memory unit has been properly addressed. A second output signal is generated when the memory unit has not been addressed by the address decoder and the write enable and the chip select signals are present at the memory unit.

6 Claims, 6 Drawing Sheets

MEMORY MONITORING CIRCUIT FOR DETECTING UNAUTHORIZED MEMORY ACCESS

This application is a continuation of application Ser. Code/No. 08/163,811, filed Dec. 9, 1993 now abandoned.

BACKGROUND OF THE INVENTION

The following co-pending applications are commonly assigned to Pitney Bowes Inc. and have been concurrently filed, U.S. patent application Ser. No. 08/163,627, entitled MULTIPLE PULSE WIDTH MODULATION CIRCUIT; U.S. patent application Ser. No. 08/165,134, entitled DUAL MODE TIMER-COUNTER; U.S. patent application Ser. No. 08/137,460, entitled DYNAMICALLY PROGRAMMABLE TIMER-COUNTER; U.S. patent application Ser. No. 5,377,264 issued on Dec. 27, 1994, entitled MEMORY ACCESS PROTECTION CIRCUIT WITH ENCRYPTION KEY; U.S. patent application Ser. No. 08/163,771, entitled MULTI-MEMORY ACCESS LIMITING CIRCUIT FOR A MULTI-MEMORY DEVICE; U.S. Pat. application Ser. No. 08/163,790, entitled ADDRESS DECODER WITH MEMORY ALLOCATION FOR A MICRO-CONTROLLER SYSTEM; U.S. patent application Ser. No. 08/163,810, entitled INTERRUPT CONTROLLER FOR AN INTEGRATED CIRCUIT; U.S. patent application Ser. No. 08/163,812, entitled ADDRESS DECODER WITH MEMORY WAIT STATE CIRCUIT; U.S. patent application Ser. No. 08/163,813, entitled ADDRESS DECODER WITH MEMORY ALLOCATION AND ILLEGAL ADDRESS DETECTION FOR A MICRO-CONTROLLER SYSTEM; U.S. Pat. application Ser. No. 08/164,100, entitled PROGRAMMABLE CLOCK MODULE FOR POSTAGE METERING CONTROL SYSTEM; and U.S. patent application Ser. No. 08/163,629, entitled CONTROL SYSTEM FOR AN ELECTRONIC POSTAGE METER HAVING A PROGRAMMABLE APPLICATION SPECIFIC INTEGRATED CIRCUIT, unless otherwise noted, all of which patent applications are now pending.

BACKGROUND OF THE INVENTION

The present invention relates to a control system having one or more memory units and a circuit for enabling access to the memory units for writing information into selected ones of the memory units under particular circumstances and, more particularly, to a monitoring circuit for detecting external access to one of the memory units independent of the enabling circuit.

A conventional postage metering system includes an accounting system for recording the mount of funds and other transaction information dispensed during the metering process. These records are electronically maintained in the non-volatile memory units which are part of the accounting system. It is therefore important to detect when the accounting system has been accessed for the principal purpose of unauthorized alteration of the accounting records, for example, fraudulently increasing the posting funds available.

In order to provide fund security, it is conventional to place the accounting system within a secure housing which includes some means of visually detecting whether the housing has been opened without postal service authorization, e.g., tamper seal. Each secure housing therefore must be visually inspected periodically to determine whether it has been tampered with. It is also considered necessary to provide other methods of correlating postal service records with the meter system transaction record as an added security method.

SUMMARY OF THE INVENTION

It is an objective of the present invention to provide a monitoring circuit for detecting when select memory units have been accessed independently of a memory access circuit.

It is a further objective of the present invention to provide an additional measure of security for the accounting system by providing a monitoring circuit which detects when the nonvolatile memory units of the accounting system have been accessed independently of the metering process.

It is a still further objective of the present invention to provide a means of disabling the metering system when the monitoring circuit detects that the nonvolatile memory units have been accessed independently of the metering process.

A microprocessor control system is provided which as one of its function is to maintain the accounting record of a postage metering system. The control system includes a programmable microprocessor, read-only memory or program memory (ROM), random access memory (RAM) and one or more nonvolatile memories (NVM). The transaction records are maintained in the NVMs. An application specific integrated circuit (ASIC) is also provided. The ASIC, in response to proper instructions from the microprocessor as one of its responsibilities, read enables or write enables the NVMs.

The ASIC includes specific control pins which are electrically communicated to the respective enabling pins of the NVM'. Internal to the ASIC is a monitoring circuit which detects when the appropriate combination of control pins have been activated by the ASIC in response to a valid instruction from the microprocessor. In all other conditions, the presence of a control voltage on the enabling pins of a respective NVMs, absent a valid write instruction from the microprocessor, causes the monitoring circuit to change state, disabling the ASIC, preferably permanently, and issuing a interrupt to the microprocessor. Preferably, the interrupt is identifiable by the microprocessor to cause the microprocessor to enter an disabled mode.

DETAILED DESCRIPTION OF THE PREFERRED EMBODIMENT

Figure 1:
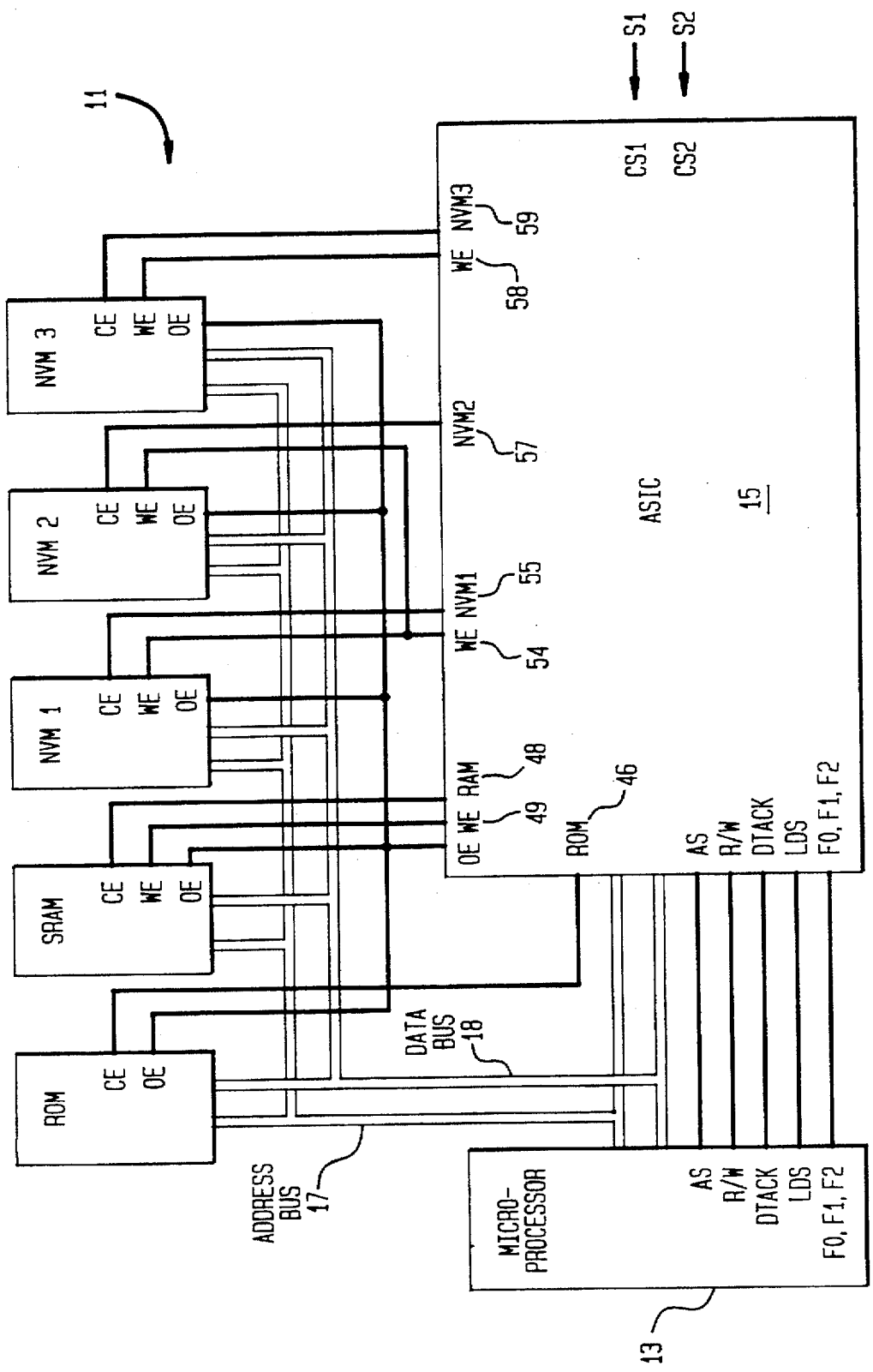
FIG. 1 is a schematic of a microcontroller system in accordance with the present invention.

Referring to FIG. 1, a microcontroller system, generally indicated as 11, is comprised of a microprocessor 13 in bus 17 and 18 communication with an application specific integrated circuit (ASIC) 15, a read only memory (ROM), a random access memory (RAM) and a plurality of non-volatile memories (NVM1, NVM2, NVM3). The microprocessor 13 also communicates with the ASIC 15 and memory units by way of a plurality of control lines, more particularly described subsequently. It should be appreciated that, in the preferred embodiment, the ASIC 15 includes a number of circuit modules or units to perform a variety of control functions related to the operation of the host device, which, in the present preferred embodiment, the host device is a postage meter mailing machine. However, for the purpose of the present invention only the processor interface 19, address decoder 20 and memory security unit 400 will be here particularly described.

Figure 2:
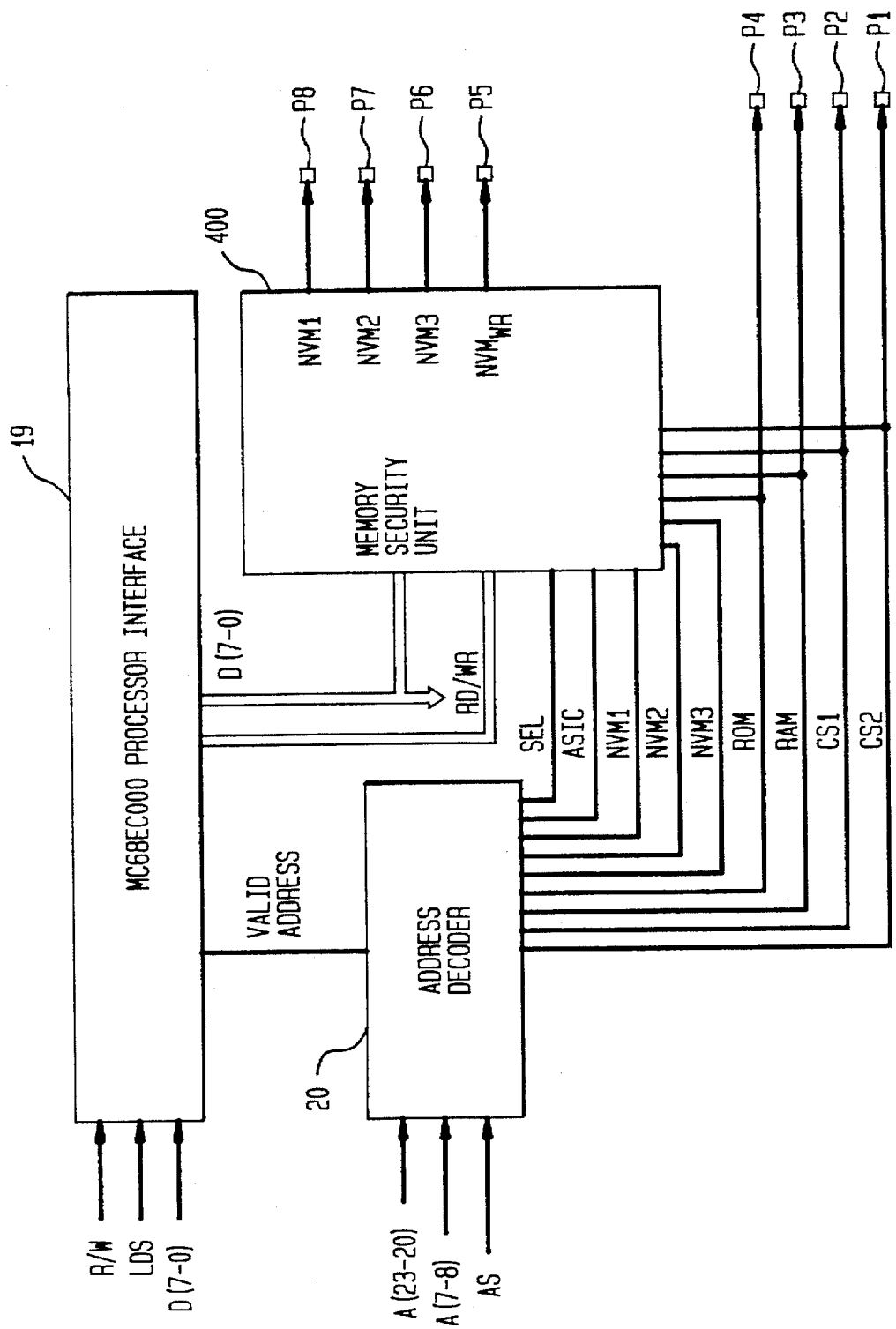
FIG. 2 is a partial schematic of the ASIC address decoder unit and ASIC NVM security unit in accordance with the present invention.

Referring to FIG. 2, the microprocessor 13 communicates the read/write (R/W) control signal, low data strobe (LDS) signal, address strobe (AS) signal, data bus lines D(7-0) and address lines A(23-0) to the input side of the ASIC 15. The R/W, LDS and data signals (D7-0) are received by a microprocessor interface circuit 19. The microprocessor interface circuit 19 performs a number of interface functions with the microprocessor. Those functions relevant to the present invention will be described subsequently. The address lines and the AS signal from the microprocessor 13 are received by the address decoder circuit 20 of the ASIC 15.

The address decoder circuit 20 outputs the number of memory access control signals directed to the memory security unit 400. Particularly, the address decoder 20 directs external to the ASIC, the ROM and RAM chip select signals to the ASIC pins P3 and P4. The address decoder 20 also internally directs chip select signals CS1 and CS2 to ASIC pins P2 and P1. In the preferred embodiment of the present invention, the chip select signals CS1 and CS2 are provided in order to control memory access to external memory devices (not shown). Each of the chip select signals, RAM, ROM, CS1 and CS2 are also directed to the input side of a NVM security controller circuit 400 of the ASIC 15. Further directed to the input side of the NVM security controller circuit are the select signal (SEL), read signal (RD), write (WR), ASIC internal memory assess select signal (ASIC), NVM1 select, NVM2 select and NVM3 select signals from the address decoder 20.

Figure 3:
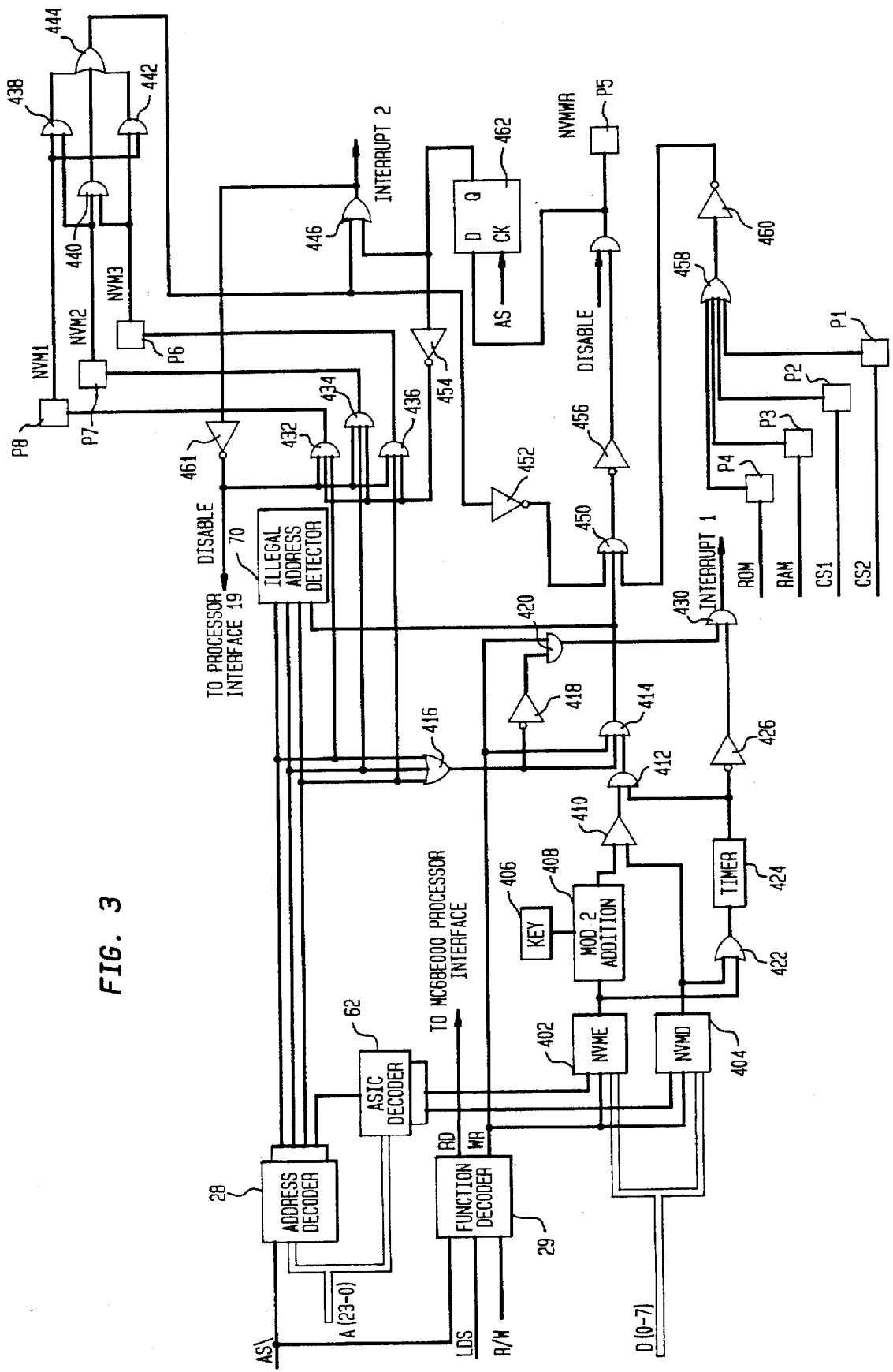
FIG. 3 is a logic schematic of the ASIC memory access and memory monitoring circuits in accordance with the present invention.

Referring to FIG. 3, the address decoder circuit includes an address decoder 28, ASIC decoder 62 and function decoder 29 which decoders will be here functionally described only to the extent relevant to the present invention. The address decoder 28 receives an AS strobe signal and address lines A(0-23) from the microprocessor. The function decoder 29 receives the AS strobe signal, LDS strobe and R/W enable signal. The NVM security circuit 400 includes an illegal address detector circuit 70, more particularly described in U.S. patent application Ser. No. 08/163,813, commonly assigned and here incorporated by reference.

A NVME register 402 and NVMD register 404 are also provided which receive input from data lines D(7-0), the function decoder 29 and ASIC decoder 62. The output from the NVME 402 is directed to a decryption circuit which needs a secret key from key register 406 and decrypts in the MOD 2 addition circuit 408. The decrypted output from the MOD 2 is compared by the comparator 410 with the encrypted data written to the NVMD register 404. Briefly here described, the data placed on D(7-0) is encrypted by the programmable microprocessor to have a specific relation to the decryption of that data by the Mod 2 Addition circuit. If that relationship is detected by the comparator 410, the output of the comparator 410 go active and is gated through gates 412, 414 and 450 to activate the NVMWR pin P5 of the ASIC under the proper condition subsequently described. The presence of the Address Strobe signal AS which initiated the sequence of events previously described at flip-flop 462 holds the flip-flop 462 output inactive in the presence of a valid NVMWR signal. If the NVMWR is externally activated before the address strobe AS signal is enabled, the flip-flop 462 is caused to change state causing OR gate 446 to go active when AS is enabled. If the OR gate goes active the state of gate 461 goes inactive disabling gates 432, 434 and 436, thereby disabling authorized memory access to the NVMs. The output of the OR gate 446 is also directed to the processor interface unit 19 which communicates to the microprocessor the interrupt condition.

Referring, more particularly, to FIGS. 4A, 4B, 4C and 4D, during an normal write cycle, the write cycle is initiated at 450 by the microprocessor 13 writing to ASIC registers to unlock the memory. The microprocessor 13 addresses decoder 28.

The address decoder 28 addresses the ASIC decoder 62 at 458. The ASIC decoder 62 then addresses the NVME register 402 and the NVMD register 404 to receive data from the data lines 0-7 at 460. The function decoder 29 write-enables the NVME register 402 and NVMD register 404 to receive the data at 462. At this point, the software encrypted information on data line (0-7) is written to NVME register 402 and NVMD 404 register at 464. The timer 424 is then initiated after the write to either NVME 402 or NVMD 404 and the OR gate 422 is activated. At 466 the encrypted data from the NVME register 402 is read and combined with the KEY, from the KEY register 406 and decrypt by the MOD 2 408 utilizing the KEY. At 468 the encrypted data is read from NVMD register 404 and compared with decrypted data from MOD 2 408 by 8 bit comparator 410. If the comparison is equal to a defined relationship at 470 then the output from comparator 410 is set active at 472. If the comparison is not equal to a defined relationship at 470 then nothing occurs at 474. The inactive state occurs when spurious data is generated and written to the registers 402 and 404.

If a valid comparison is made at 470, the comparator 410 is activated at 472 and, at 476, the output of the comparator 410 is ANDed with the output of timer 424 at AND gate 412. At 478, an AND gate 414 ANDs the output from gate 412, WR signal from decoder 29 with the output from OR gate 416.

Subsequently, microprocessor 13 writes to one of the NVMs by addressing NVM1, NVM2 or NVM3 at 452. At 454 the address decoder 28 produces the appropriate NVM# signal (NVM1, NVM2 or NVM3) corresponding to the addressed NVM. Also the decoder 28 output address causes OR gate 416 to go active at 456. Also indicated at 456, the microprocessor 13 causes the decoder 29 to produce a WR signal. Activation of OR gate 416 turns "ON" gate 418 at 480 (refer to FIG. 4B). If, at 482, the timer is active then gate 426 is turned "OFF" and as a result AND gate 430 is held "OFF" at 484. If, at 486, the timer is inactive, then gate 426 is turned "ON" at 488 causing AND gate 430 to turn "ON" an a "INTERRUPT TYPE 1" signal to be issued.

Figure 4A:
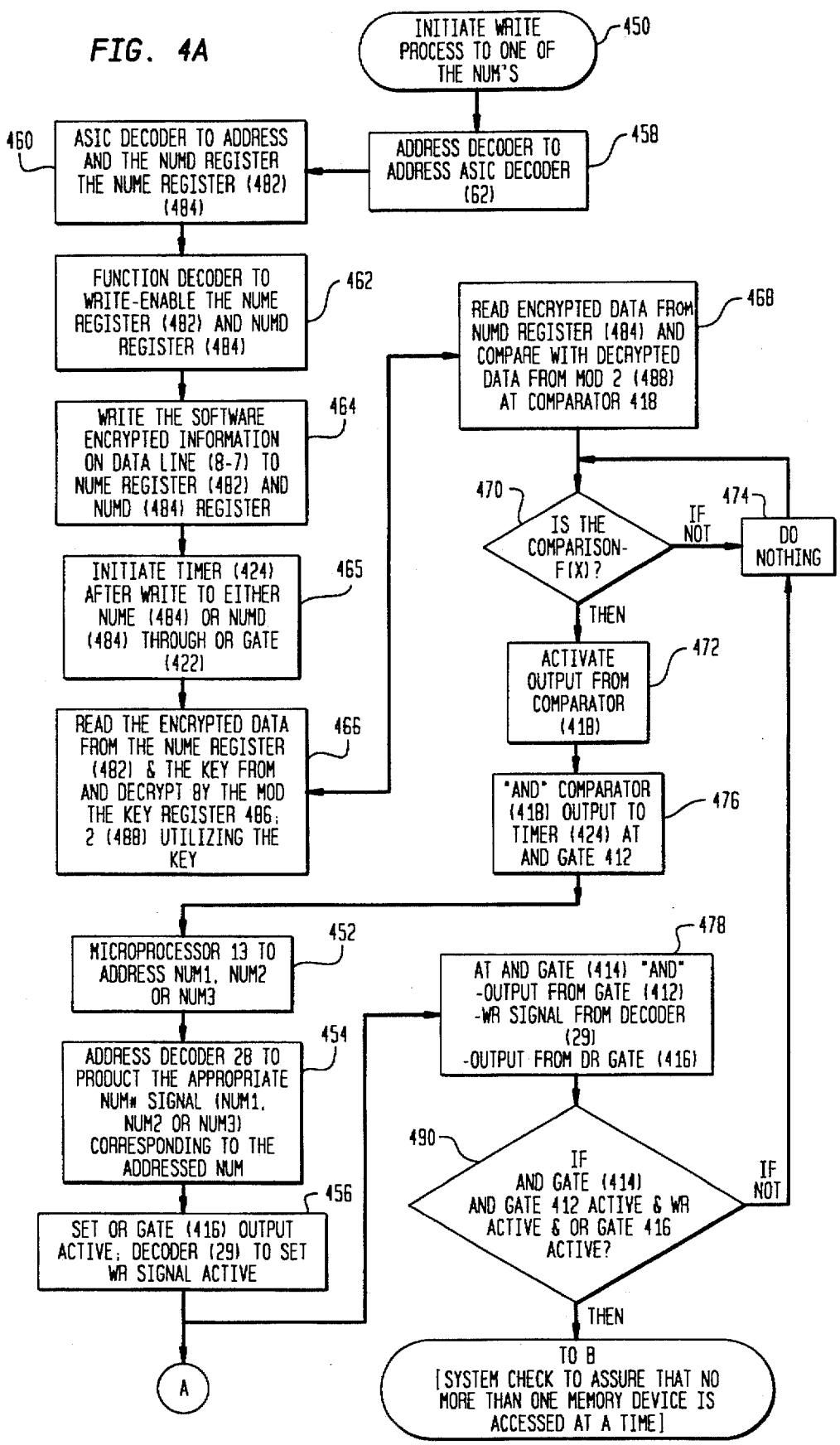
FIGS. 4A, 4B and 4C are logic diagrams of the ASIC memory circuit in accordance with the present invention.
Figure 4B:
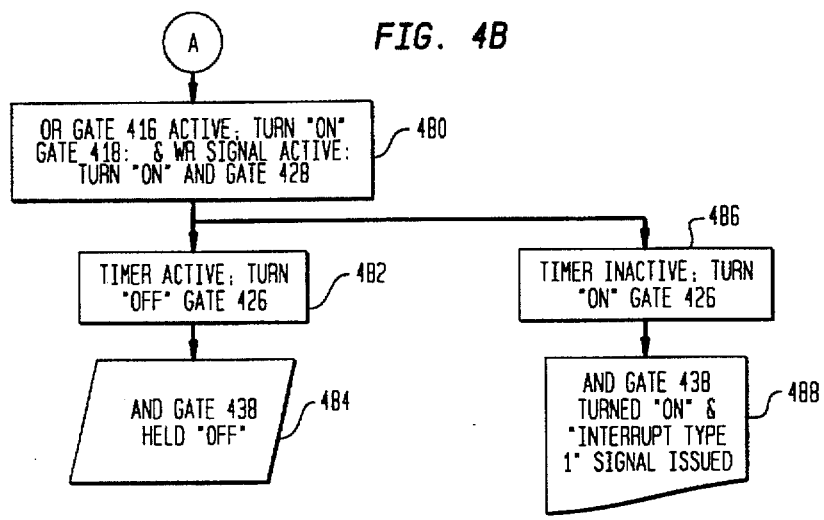

Referring to FIG. 4A, at 478, an AND gate 414 ands the output from gate 412, WR signal from decoder 29 with the output from OR gate 416. If, at 490, AND gate 414 and gate 412 are active and WR active and OR gate 416 active, then the system proceeds to check to assure that no more than one memory device is accessed at a time at 500. If not, then the system returns to location 474.

Figure 4C:
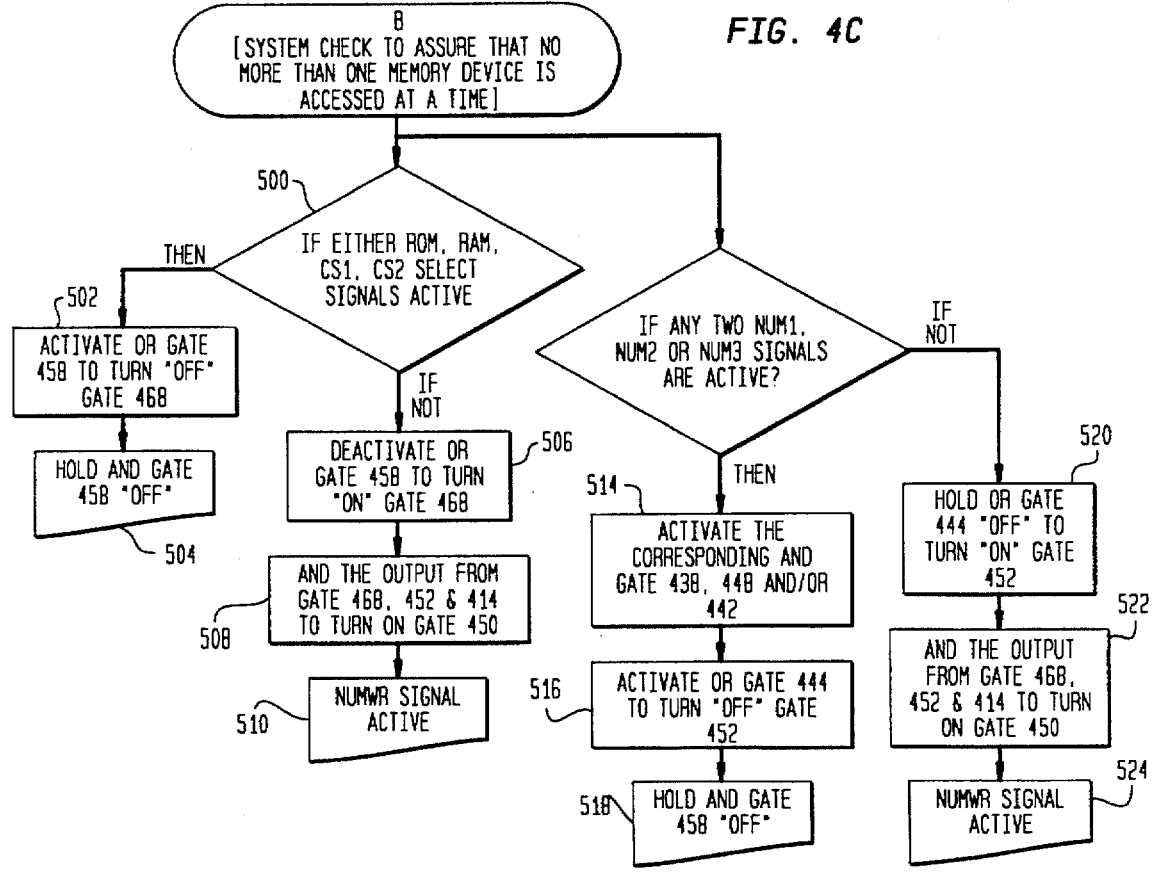

Referring to FIG. 4C, if, at 500, either ROM, RAM, CS1, CS2 select signals are active then OR gate 458 is activated to turn "OFF" gate 460 at 502 and hold AND gate 450

"OFF" at 504. This action prevents a non-volatile memory write enable signal from being issued. If, at 500, the ROM, RAM, CS1, CS2 select signals are inactive, then OR gate 458 is activated to turn "ON" gate 460 at 506. At 508, the output from gate 460, 452 and 414 are ANDed to turn "ON" gate 450 resulting in the NVMWR signal going active at 510.

If, at 512, any two NVM1, NVM2 or NVM3 signals are active then the corresponding AND gate 438, 440 and/or 442 is set active at 514. OR gate 444 is then set active to turn "OFF" gate 452 at 516 which results in AND gate 450 being held "OFF" at 518. If, at 512, any two NVM1, NVM2 or NVM3 signals are not active then OR gate 444 is held "OFF" resulting in gate 452 being turned "ON" at 520. The output from gate 460, 452 and 414 are ANDed resulting in gate 450 being turned "ON" at 522. As a result, the NVMWR signal is set active at 524.

Figure 4D:
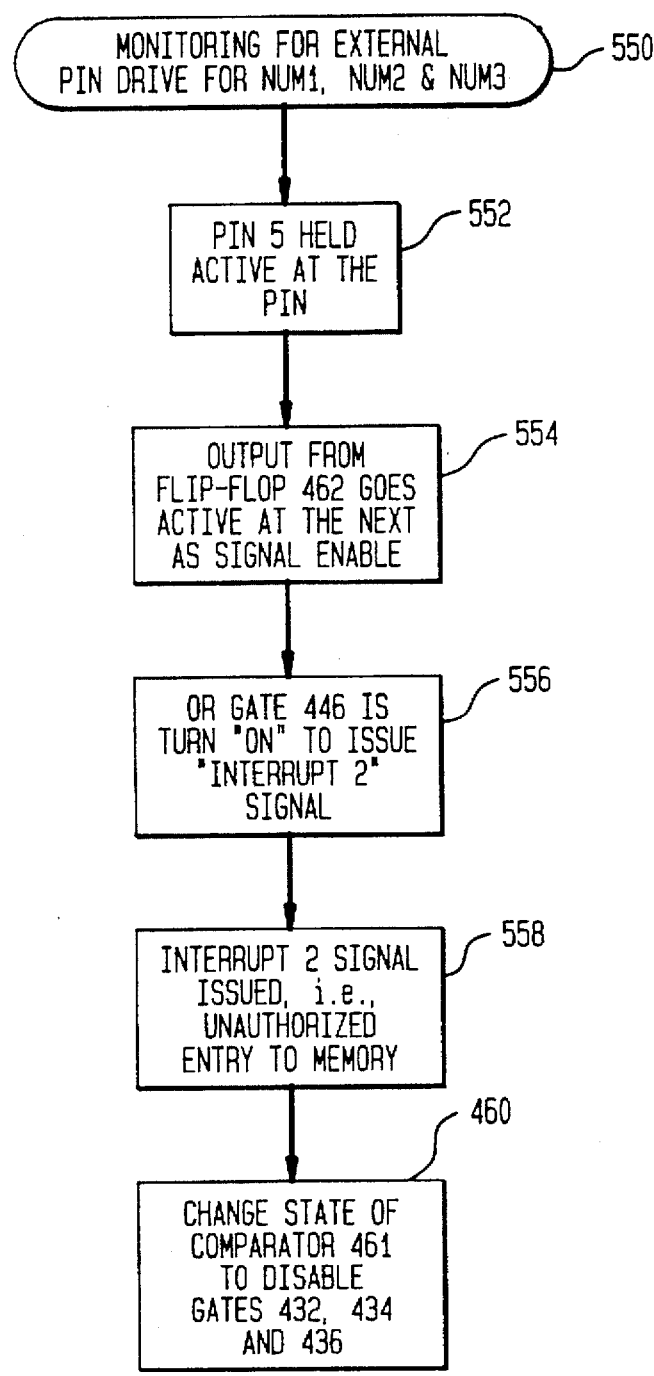
FIG. 4D is a logic diagram of the ASIC monitoring circuit in accordance with the present invention.

Referring to FIG. 4D, the system also monitors, at 550, the appropriate ASIC pins to assure that the pins for NVM1, NVM2 and NVM3 detect whether the pins are externally driven to gain unauthorized access to the memories. In order to gain access, both the NVMWR pin and one of the NVM pins P6, P7 or P8 must be held active. At 552, when pin 5 is illegally held active, the output from flip-flop 462 goes active when the AS signal is enabled at 554. As a result, OR gate 446 is turned "ON" to issue "Interrupt 2" signal at 556. At 558, the "Interrupt 2" signal is issued and recorded an unauthorized entry to memory. Now at 460, the change of state of gate 461 disables AND gates 432, 434 and 436, thereby permanently disabling the meter NVM memory access.

What is claimed is:

1. A memory security circuit in electronic bus communication with a memory access circuit for detecting when memory units have been accessed independently of said memory access circuit, said memory access circuit having circuit means programmed to provide a unique address signal for write enabling a discrete memory unit, said discrete memory unit having a write enable pin and chip select pin, which when enabled concurrently, permits writing into said discrete memory unit, comprising:

address decoding means for receiving said unique address signal and causing a write enable signal and chip select signal to be generated for said discrete memory unit, means for electrically communicating said generated write enable signal and chip select signal to be received respectively by said write enable pin and said chip select pin of said discrete memory unit, means for monitoring said write enable pin and said chip select pin of said discrete memory unit and having a first output signal when said discrete memory unit has been addressed by said memory access circuit pursuant to the issuance of said unique address and having a second output signal when said memory unit has not been addressed by said memory access circuit and said write enable and said chip select signals have been generated, means responsive to said second output signal to record said occurrence of said second output signal.

2. A memory security circuit as claimed in claim 1 wherein said circuit means comprises a programmable microprocessor.

3. A memory security circuit in electronic bus communication with a memory access circuit for detecting when a memory unit has been accessed independently of an address instruction of a programmable microprocessor in electronic bus communication with said memory security circuit which provides a unique address signal for write enabling a discrete memory unit, said discrete memory unit having a write enable pin and chip select pin, which when enabled concurrently, permits writing into said memory discrete unit, comprising:

address decoding means for receiving said unique address instruction and causing a write enable signal and chip select signal to be generated for said discrete memory unit, first means for electrically communicating said generated write enable signal and chip select signal to be received respectively by said write enable pin and said chip select pin of said discrete memory unit, second means for monitoring said write enable pin and said chip select pin of said discrete memory unit and having a first output signal when said discrete memory unit has been addressed by said address instruction pursuant to the issuance of said unique address and a second output signal when said discrete memory unit has not been addressed by said memory access circuit and said write enable and said chip select signals have been generated, and third means responsive to said second output signal to record said occurrence of said second output signal and disabling said first means.

4. A memory security circuit as claimed in claim 3 wherein said third means further comprises means for generating a third output signal direct to said microprocessor, said microprocessor being programmed to upon receiving said third output signal to execute a program routing disabling said microprocessor.

5. In a postage metering system, a memory security circuit in communication with a memory access circuit for detecting when memory units have been accessed independently of said memory access circuit, said memory access circuit having circuit means programmed to provide a unique address signal for write enabling a discrete memory unit, said discrete memory unit having a write enable pin and chip select pin, which when enabled concurrently, permits writing into said discrete memory unit, the memory security circuit comprising:

address decoding means for receiving said unique address signal and causing a write enable signal and chip select signal to be generated for said discrete memory unit, means for electrically communicating said generated write enable signal and chip select signal to be received by said write enable pin and said chip select pin, respectively, of said discrete memory unit, means for monitoring said write enable pin and said chip select pin of said discrete memory unit and producing: (1) a first output signal when said discrete memory unit has been addressed by said memory access circuit pursuant to the issuance of said unique address so that writing into said discrete memory unit is permitted, and (2) a second output signal when said memory access circuit and said write enable and said chip select signals have been supplied by a source external to the memory access circuit so that writing into said discrete memory unit is prevented, and means responsive to said second output signal for disabling the postage metering system.

6. A memory security circuit as claimed in claim 5 further comprising:

a plurality of gates corresponding to the respective memory units, means for producing an address strobe signal,
means for producing an NVMWR signal,
a flip-flop having the address strobe signal and the NVMWR signal as inputs and in electrical communication with the gates such that: (1) the flip-flop is inactive if the address strobe signal and the NVMWR signal are both valid, and (2) the flip-flop is active if the address strobe signal is not valid and the NVMWR signal is valid causing the gates to become disabled and preventing access to the memory units.

* * * * *